United States Patent Office 3,102,878
Patented Sept. 3, 1963

3,102,878
PRODUCTION OF WATER-SOLUBLE
DYESTUFFS SALTS
Hans Baumann and Johannes Dehnert, Ludwigshafen (Rhine), Germany, assignors to Badische Anilin- & Soda-Fabrik Aktiengesellschaft, Ludwigshafen (Rhine), Rhineland-Pfalz, Bundesrepublik, Germany
No Drawing. Filed Apr. 11, 1960, Ser. No. 21,158
2 Claims. (Cl. 260—146)

This invention relates to a process for the production of water-soluble dyestuff salts which contain an azo dyestuff as cation.

It is known that water-soluble dyestuff salts which contain an azo dyestuff as cation are outstandingly suitable for dyeing textile materials of polymers of acrylonitrile. The term "polymers of acrylonitrile" includes polyacrylonitrile itself and also the interpolymers of acrylonitrile with other polymerizable compounds, such as vinyl chloride and vinyl acetate, the tinctorial properties of these interpolymers being determined by the acrylonitrile component. Such interpolymers preferably contain more than 50% of their weight of acrylonitrile. Water-soluble dyestuff salts which contain an azo dyestuff as cation dye the said textile materials pure shades of excellent fastness properties, especially outstanding fastness to light.

Of the said water-soluble dyestuff salts those are especially valuable technically which contain as cation an azo dyestuff of the general Formula I:

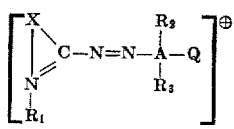

(I)

in which X represents one of the groups

—C=CH—CH=CH—
—CH=CH—S—
—N=CH—S—

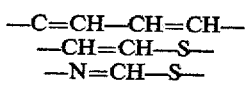

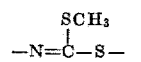

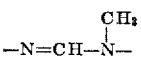

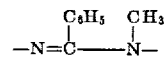

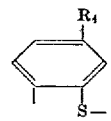

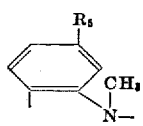

$R_4$ standing for a hydrogen or chlorine atom, a methoxy or ethoxy group, $R_5$ for a hydrogen or chlorine atom or a methoxy group, $R_1$ being a methyl, ethyl, benzyl or phenyl radical, A a paraphenylene radical or a paranaphthylene radical, $R_2$ a hydrogen atom or a methoxy group, $R_3$ a hydrogen atom, a methoxy group or an acetylamino group and Q an N-pyrrolidino, N-piperidino, N-hexamethylenimino, N-morpholino, N-1,2,3,4-tetrahydroquinolino, N-2,3-benzomorpholino, N-6-methoxyindolino, or N-2-methylindolino radical or a radical of the general Formula II:

(II)

in which $R_6$ stands for a hydrogen atom, a methyl group, an ethyl group, a butyl group, a 2-hydroxyethyl group, a 2-methoxyethyl group, a 2-cyanoethyl group, a 3-cyanopropyl group or a group of the Formula III:

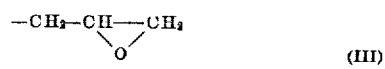

(III)

and $R_7$ represents a methyl, ethyl, propyl, 2-hydroxyethyl, 2-methoxyethyl, 3-methoxypropyl, 2-cyanoethyl, 3-cyanopropyl, 2-acetoxyethyl, 2-(N,N-dimethylamino)ethyl, phenyl, 4- tolyl, 4-ethylphenyl, 4-propylphenyl, 4-methoxyphenyl, 2,4-dimethoxyphenyl, 4-(N,N-diethylamino)-phenyl, 4-acetylaminophenyl, 4-chloracetylaminophenyl, 4-phenylaminophenyl, 2-methoxy-4-phenylaminophenyl, or pyridyl-3 group, the group Q being in para-position to the azo group.

In the said dyestuff salts, the above-mentioned cation is attached to the equivalent of an anion which is represented below by $Z^\ominus$. The nature of this anion is without significance so far as the tinctorial applicability is concerned. It may be the anion of an inorganic or organic acid. The anion may be monovalent or polyvalent. Examples of such anions are the chloride, bromide, iodide, perchlorate, sulfate, trichlorozincate, dihydrogen phosphate, monohydrogen phosphate, acetate, trichloracetate and oxalate anions.

It is known that dyestuff salts of the Formula I are obtained when diazotizable amines of the general Formula IV:

(IV)

in which X has the meaning given above are coupled with amines of the general Formula V:

(V)

in which A, $R_2$, $R_3$ and Q have the meanings given above, and the resultant azo dyestuffs are treated with alkylating agents.

This method has the disadvantage however that not all amines of the Formula V can be coupled with the said diazo compounds; often this reaction gives only small yields of the desired azo dyestuffs. This is usually due to the fact that the said amines contain in the group Q substituents which also react with the diazo compounds used, i.e. give rise to undesirable side reactions. Often however it is just those dyestuff salts which can only be prepared in bad yields by the said process which are valuable dyestuffs.

It is the object of the present invention to provide a process which is not attended by the said disadvantage.

We have found that water-soluble dyestuff salts which contain the cations of the Formula I can be obtained in excellent yields by reacting with an amine of the general formula H—Q in which Q has the meaning given above a dyestuff salt of the Formula VI:

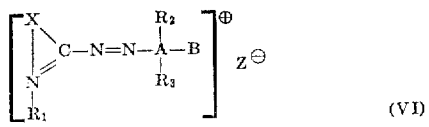

(VI)

in which the radicals X, $R_1$, $R_2$, $R_3$, Z have the meanings given above and B represents a methoxy group, an ethoxy group, a fluorine atom, a chlorine atom or a bromine atom.

Examples of amines of the general formula H—Q are pyrrolidine, piperidine, hexamethylene imine, morpholine, 1,2,3,4-tetrahydroquinoline, benzo(b)morpholine, 6-methoxyindoline, 2-methylindoline, methylamine, dimethylamine, methylethylamine, diethylamine, isopropylamine, butylamine, methylbutylamine, ethanolamine, diethanolamine, 2-methoxyethylamine, 3-methoxypropylamine, methyl-(2-hydroxyethyl)-amine, 2-(N,N-dimethylamino)-ethylamine, bis-(2-cyanoethyl)-amine, bis-(3-cyanopropyl)-amine, aniline, para-toluidine, para-anisidine, 4-isopropylaniline, 2-naphthylamine, 2,4-dimethoxyaniline, 4-acetylaminoaniline, 4-chloracetylaminoaniline, 2-methoxy-4-phenylaminoaniline and 3-aminopyridine. The said amines can also be used in the form of their water-soluble salts, for example their hydrochlorides, hydrobromides, sulfates, acetates and chloracetates.

The reaction of the dyestuffs of the Formula VI with the said amines is carried out in aqueous solution, in organic solvents or in mixtures of water and organic solvents, preferably at elevated temperatures, such as 30° to 100° C. It is especially advantageous to add tertiary amines, such as pyridine, trimethylamine or triethanolamine, in small amounts; the speed of the reaction is thereby considerably increased.

It is also preferable to introduce the aqueous reaction mixture into an organic solvent, especially when water-insoluble or weakly basic amines, for example of the aromatic or heterocyclic series, are used as the amines H—Q. Suitable organic solvents are those which are miscible with water, as for example short-chain alcohols such as methanol, ethanol and isopropanol, short-chain aliphatic carboxylic acids, such as formic acid and acetic acid, or short-chain acid amides, such as formamide and dimethylformamide.

The dyestuff salts of Formula VI may be prepared by two different methods. They can be obtained by coupling diazotized amines of the general Formul IV with amines of the general Formula VII:

(VII)

in which A, B, $R_2$ and $R_3$ have the meanings given above, and reacting the resultant azo dyestuffs with methyl bromide, methyl iodide, dimethyl sulfate, ethyl bromide, ethyl iodide, diethyl sulfate, benzyl chloride or benzyl bromide.

The other method comprises the reaction of hydrazones of the general Formula VIII:

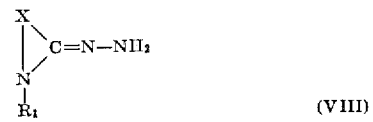

(VIII)

in which X and $R_1$ have the meanings given above, with compounds of the general formula H—A—B in which A and B have the meanings given above, in the presence of acids and dehydrogenating agents. This process is described in U.S. patent application Serial No. 519,674, filed July 1, 1955, by Siegfried Huenig.

In the reaction of dyestuff salts of the Formula VI with amines of the formula H—Q, the above-mentioned group B is exchanged for the radical Q. In this exchange reaction, a clear increase in depth of color is noticeable in the reaction mixture. The end of the exchange reaction may therefore easily be established by the uniformity of a paper chromatogram prepared from a sample taken from the reaction mixture.

The dyestuff salts of the Formula I dissolve not only in water but also in hydrophilic organic solvents, such as alcohols, glycols and short-chain acid amides. They are especially suitable for dyeing textile materials, such as fibers, threads, flocks, woven and non-woven textiles of polymers of acrylonitrile.

The following Examples will further illustrate this invention but the invention is not restricted to these Examples. The parts, unless otherwise specified, are parts by weight. The parts by volume have the same relation to the parts by weight as the liter to the kilogram under normal conditions. Percentages are by weight.

*Example 1*

36 parts of 2-amino-6-methoxybenzthiazole are diazotized in known manner in sulfuric acid with an amount of nitrosylsulfuric acid corresponding to 14 parts of sodium nitrite. A solution of 22 parts of methoxybenzene in 250 parts of acetic acid is allowed to flow into the diazo suspension while cooling. After the coupling is ended, the reaction mixture is poured into 4000 parts of ice-water and the reaction product filtered off, washed with water until a neutral reaction is obtained and dried at 80° C.

The total amount of the powdered coupling product obtained is stirred with 300 parts of chloroform and, after adding 20 parts of dimethyl sulfate, heated for 5 hours at 60° C. until a sample withdrawn is uniform in a paper chromatogram. The mixture is allowed to cool and the dyestuff precipitated with benzene, filtered off, washed with benzene and dried. There are obtained 53 parts of the dyestuff of the formula

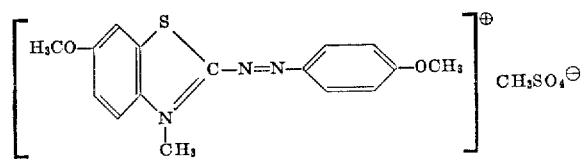

which dissolves in hot water with a red coloration and dyes polyacrylonitrile covered Bordeaux shades.

20 parts of this dyestuff salt are dissolved in 200 parts of ethyl alcohol, 12 parts of acetic acid and 20 parts of 1-amino-2,4-dimethoxybenzene are added and the mixture heated to boiling while stirring until the solution, after about two hours, is paper-chromatographically uniform. Then 25 parts of 30% hydrochloric acid and 1200 parts of water are added and the blue dyestuff formed is precipitated with 25 parts of a 50% zinc chloride solution and 200 parts of saturated sodium chloride solution. It is filtered off, washed with 5% sodium chloride solution and dried at 80° C. There are obtained 27 parts of the dyestuff of the formula

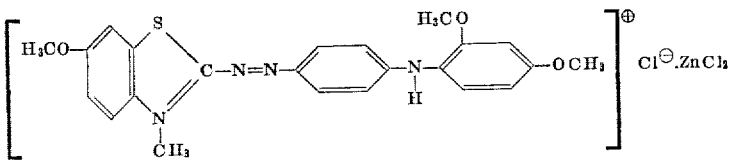

which dissolves in hot water with a reddish-blue color and in dilute alcohol or acetone with a green-blue color. It dyes polyacrylonitrile fibers greenish-blue shades very fast to light from an acetic acid or sulfuric acid bath.

If 1-methylamino-4-methoxybenzene is used instead of 1-amino-2,4-dimethoxybenzene, and formamide is used as the solvent, a greenish-blue dyestuff of the formula:

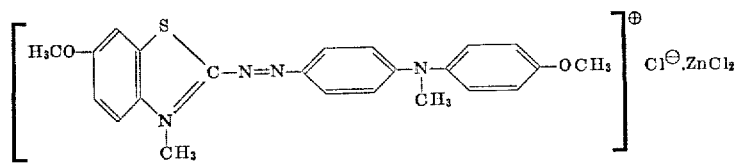

is obtained.

A dyestuff of the formula:

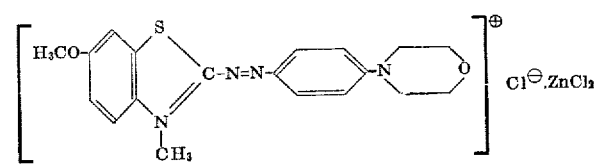

which dyes acetyl cellulose in reddish-blue shades fast to waste gas is obtained by using morpholine acetate instead of 1-amino-2,4-dimethoxybenzene and water as solvent.

Example 2

19.2 parts of 3-amino-1,2,4-triazole-5-carboxylic acid together with 12.5 parts of 50% sodium hydroxide solution are dissolved in 250 parts of water. After adding 10.5 parts of sodium nitrite, the whole is cooled to $-2°$ C. and 60 parts of 10 N hydrochloric acid allowed to flow in while stirring vigorously. With further cooling, a solution of 22 parts of 1,3-dimethoxybenzene in 400 parts of acetic acid is added to the said diazo suspension and stirring continued until the coupling is completed. The coupling product is precipitated by adding water, filtered off, washed with water and dried.

41 parts of the powdered dyestuff are stirred together with 6 parts of magnesium oxide and 350 parts of chloroform. 45 parts of dimethyl sulfate are added, the whole is heated for 6 hours at 50° C. and the solvent then distilled off. The residue is dissolved in 500 parts of water with the addition of 20 parts of 10 N hydrochloric acid and the solution heated to 80° C. until the carboxyl group situated on the triazole ring has been completely split off. The dyestuff salt is deposited by adding 50 parts of 50% zinc chloride solution and 100 parts of sodium chloride, filtered off and dried at 50° C. under reduced pressure. 55 parts of the dyestuff of the formula

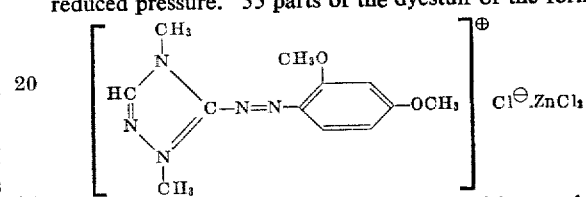

are obtained which dissolves in water with a reddish-yellow color and dyes polyacrylonitrile fibers orange-red shades.

37 parts of the this dyestuff are made into a paste with water and heated with 20 parts of piperidine and 15 parts of crystallized sodium acetate at 40° to 50° C. until a sample of the red dyestuff formed is paper-chromatographically uniform. 500 parts of water and 15 parts of acetic acid are added to the reaction mixture and the dyestuff formed is precipitated with 50 parts of 50% zinc chloride solution. It has the formula

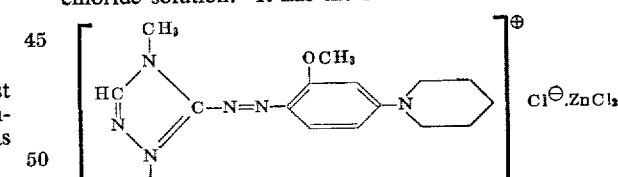

dissolves in water with a red color and dyes polyacrylonitrile fibers clear red shades of excellent fastness properties.

By using 1-acetylamino-4-aminobenzene instead of piperidine and working with dimethylformamide as solvent, there is obtained a claret-colored dyestuff of the formula

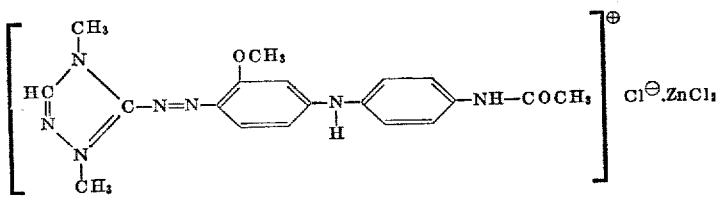

Further basic dyestuffs with similar properties are obtained from the components of columns 2 and 4 of the following table, only one of the amines given in column 4 being used in each case. In columns 3 and 5 there are given the shades of color of the dyeings obtained with the initial dyestuffs and with the dyestuffs prepared according to the new process.

| Example No. | Dyestuff salt | Color of dyeing | Amine | Color of dyeing |
|---|---|---|---|---|
| 3 | (structure) | orange | dimethylamine | bluish-red. |
| | | | morpholine | red. |
| | | | pyrrolidine | bluish red. |
| | | | 2-cyanoethylmethylamine | red. |
| | | | 3-methoxy-4-aminodiphenylamine. | blue-grey. |
| | | | butylamine | bluish-red. |
| | | | 4-aminodiphenylamine | blue-grey. |
| 4 | (structure) | ...do... | 3-methoxypropylamine | red. |
| | | | methyl-2-hydroxyethylamine. | bluish-red. |
| | | | dimethylamine | Do. |
| | | | piperidine | Bordeaux. |
| | | | 1-amino-2,4-dimethoxybenzene. | red-violet. |
| 5 | (structure) | Bordeaux | 1-amino-4-dimethylaminobenzene. | blue. |
| | | | piperidine | reddish-blue. |
| | | | bis-(2-cyanoethyl)amine | violet. |
| | | | 1-amino-2,4-dimethoxybenzene. | blue. |
| | | | N,N,N'-trimethylethylene diamine. | blue violet. |
| | | | bis-(3-cyanopropyl)-amine | violet. |
| 6 | (structure) | red-orange | dimethylamine | red-violet. |
| | | | morpholine | Do. |
| | | | piperidine | violet. |
| | | | tetrahydroquinoline | blue. |
| | | | pyridinium salt of 1-amino-4-chloracetylaminobenzene. | blue-violet. |
| | | | 2,3-benzomorpholine | Do. |
| | | | 1-amino-4-diethylaminobenzene. | blue. |
| | | | bis-(2-methoxyethyl)-amine | violet. |
| 7 | (structure) | Bordeaux | morpholine | blue. |
| | | | piperidine | greenish-blue. |
| | | | hexamethyleneimine | Do. |
| | | | methyl-2-acetoxyethylamine. | blue. |
| | | | methylaminobenzene | greenish-blue. |
| | | | 2-methylindoline | Do. |
| | | | 2-methyl-6-methoxyindoline. | blue-green. |
| 8 | (structure) | brown-orange | methylethylamine | violet. |
| | | | piperidine | blue-violet. |
| | | | butylamine | red-violet. |
| | | | 1-amino-2,4-dimethoxybenzene. | blue-violet. |
| | | | 1-amino-4-methylbenzene | Do. |
| 9 | (structure) | red-orange | morpholine | violet. |
| | | | methyl-2-hydroxyethylamine. | blue-violet. |
| | | | piperidine | Do. |
| | | | pyrrolidine | Do. |
| | | | 1-amino-4-isopropylbenzene. | blue. |

*Example 10*

16 parts of the azo compound of the formula

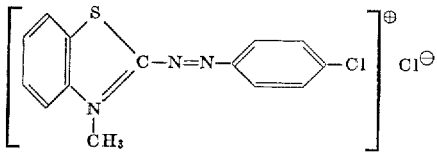

are introduced into a mixture of 200 parts of dimethylformamide and 50 parts of a 2-molar aqueous solution of morpholine acetate and the whole stirred for several hours at room temperature until the originally orange-colored initial compound has been converted into a pure blue dyestuff. It is then diluted with 850 parts of water and the dyestuff formed is precipitated from the solution with 25 parts of a 50% zinc chloride solution and 80 parts of sodium chloride. It is filtered off by suction, washed on the filter with dilute sodium chloride solution and dried under reduced pressure at 50° C. 18 parts of the dyestuff of the formula

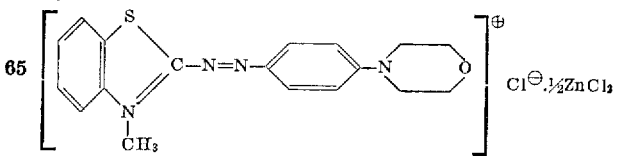

are obtained; it dissolves in water with a reddish-blue color and dyes polyacrylonitrile fibers pure blue shades.

The initial compound used may be prepared in the following way:

158 parts of 2-methylmercapto-3-methylbenzthiazolium methosulfate and 90 parts of 4-chlorphenylhydrazine hydrochloride are stirred in 700 parts of ethanol. After adding 5 parts of triethylamine and 280 parts of a 2-molar aqueous solution of sodium acetate, the whole is boiled on the waterbath while stirring until the evolution of methyl mercaptan has ended. The 3-methyl-benzthiazolone-2-(4-chlorphenylhydrazone) is filtered while cooling with ice and the filter residue is stirred in 500 parts of ethanol. At room temperature there is dripped into the suspension an aqueous solution of 280 parts of crystallized iron (III) chloride. After stirring for several hours, the product is filtered off by suction, washed with a little ethanol on the filter and dried under reduced pressure at room temperature. The azo compound of the formula given above is obtained; it dissolves in alcohol or hot water with a brown-yellow color and becomes discolored to blue to blue-green upon the addition of acid-binding agents, such as pyridine, sodium acetate or sodium carbonate.

Further valuable dyestuffs are obtained in the same way from the dyestuff salts and amines given in the following table; the final column gives the shade of color of the dyeing on polyacrylonitrile:

| Example No. | Dyestuff salt | Amine | Shade |
|---|---|---|---|
| 11 | 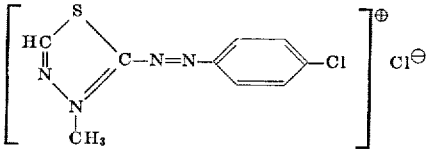 |  | violet. |
| 12 | 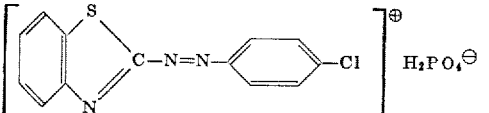 |  | greenish-blue. |
| 13 | 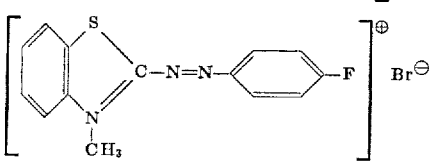 |  | blue. |
| 14 | 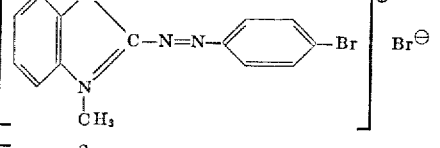 | 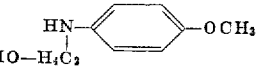 | greenish-blue. |
| 15 | 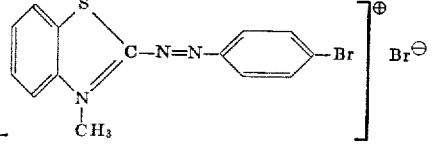 | 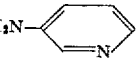 | blue. |
| 16 | 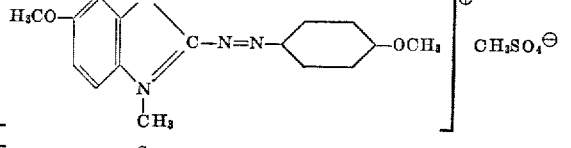 |  | Do. |
| 17 | 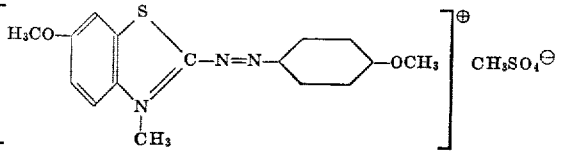 |  | Do. |
| 18 | 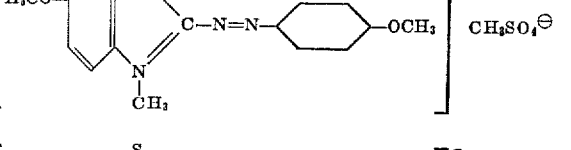 | 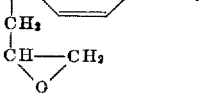 | greenish-blue. |
| 19 | 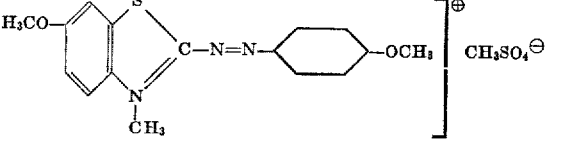 | 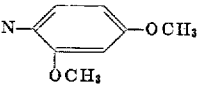 | Do. |

| Example No. | Dyestuff salt | Amine | Shade |
|---|---|---|---|
| 20 | | | Do. |
| 21 | | | violet. |
| 22 | | | red-violet. |
| 23 | | | violet. |
| 24 | | | Do. |
| 25 | | | Do. |

We claim:
1. A process for the production of water-soluble dyestuff salts wherein a dyestuff salt of the general formula:

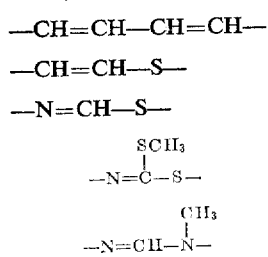

in which X is a radical selected from the class consisting of the radicals having the formulae

—CH=CH—CH=CH—

—CH=CH—S—

—N=CH—S—

$$-N=\underset{\underset{S}{|}}{\overset{SCH_3}{|}}C-S-$$

$$-N=CH-\underset{\underset{CH_3}{|}}{N}-$$

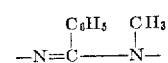

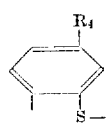

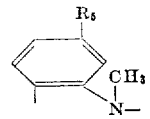

in which $R_4$ stands for a radical selected from the class consisting of a hydrogen atom, a chlorine atom, a methoxy group and an ethoxy group, $R_5$ is a radical selected from the class consisting of a hydrogen atom, a chlorine atom and a methoxy group, $R_1$ a radical selected from the class consisting of a methyl group, an ethyl group, a benzyl group and a phenyl group, A a radical selected from the class consisting of a para-phenylene radical and a para-naphthylene radical, $R_2$ a radical selected from the class consisting of a hydrogen atom and a methoxy group, $R_3$ a radical selected from the class consisting of a hydrogen atom, a methoxy group and an acetylamino group, B a radical selected from the class consisting of a methoxy group, an ethoxy group, a fluorine atom, a chlorine atom and a bromine atom, and Z is an anion which does not affect the tinctorial applicability of the azo dyestuff cation is reacted in a medium selected from the class consisting of water, an organic solvent and mixtures thereof, said organic solvent being selected from the group consisting of short-chain alcohols, short-chain aliphatic carboxylic acids and short-chain amides, at a temperature of about 30° C. to 100° C. with an amine of the general formula:

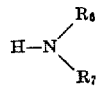

in which $R_6$ represents a substituent selected from the class consisting of a hydrogen atom, a methyl group, an ethyl group, a butyl group, a 2-hydroxyethyl group, a 2-methoxyethyl group, a 2-cyanoethyl group, a 3-cyanopropyl group and a group of the formula

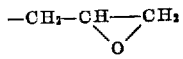

and $R_7$ stands for a substituent selected from the class consisting of a methyl group, an ethyl group, a propyl group, a 2-hydroxyethyl group, a 2-methoxyethyl group, a 3-methoxypropyl group, a 2-cyanoethyl group, a 3-cyanopropyl group, a 2-acetoxyethyl group, a 2-(N,N-dimethylamino) ethyl group, a phenyl group, a 4-methylphenyl group, a 4-ethylphenyl group, a 4-propylphenyl group, a 4-methoxyphenyl group, a 2,4-dimethoxyphenyl group, a 4-(N,N-diethylamino) phenyl group, a 4-acetylaminophenyl group, a 4-chloracetylaminophenyl group, a 4-phenylaminophenyl group, a 2-methoxy-4-phenylaminophenyl group, and a pyridyl-3-group and further members wherein $R_6$ and $R_7$ taken together with HN< form pyrrolidine, piperidine, hexamethylene imine, morpholine, 1,2,3,4-tetrahydroquinoline, N-2,3-benzomorpholine, 6-methoxy-indoline, and 2-methyl-indoline.

2. A process as claimed in claim 1 wherein said reaction is carried out in the presence of a small amount of a tertiary amine selected from the group consisting of pyridine, trimethylamine and triethanolamine.

References Cited in the file of this patent
UNITED STATES PATENTS

| | | |
|---|---|---|
| 2,312,040 | Kendall et al. | Feb. 23, 1943 |
| 2,647,901 | Archer | Aug. 4, 1953 |
| 2,832,764 | Huenig | Apr. 29, 1958 |

UNITED STATES PATENT OFFICE
CERTIFICATE OF CORRECTION

Patent No. 3,102,878                 September 3, 1963

Hans Baumann et al.

It is hereby certified that error appears in the above numbered patent requiring correction and that the said Letters Patent should read as corrected below.

In the heading to the printed specification, between lines 8 and 9, insert the following:

Claims priority, application Germany Apr. 17, 1959 column 3, line 44, for "salis" read -- salts --; line 66, for "Formul" read -- Formula --; columns 11 and 12, in the table, second column, the right-hand portion of the formula, for "Example No. 25, for "$H_2C-COO^{\ominus}$" read -- $H_3C-COO^{\ominus}$ Signed and sealed this 21st day of July 1964.

(SEAL)
Attest:

TOM G. JOHNSON
Officer

EDWARD J. BRENNER
Commissioner of Patents